United States Patent [19]

Cammons et al.

[11] Patent Number: 5,082,345
[45] Date of Patent: Jan. 21, 1992

[54] OPTICAL FIBER CONNECTING DEVICE INCLUDING ATTENUATOR

[75] Inventors: Ray R. Cammons, Woodstock; A. Wallace Carlisle, Dunwoody; N. R. Lampert, Norcross, all of Ga.

[73] Assignee: AT&T Bell Laboratories, Murray Hill, N.J.

[21] Appl. No.: 566,588

[22] Filed: Aug. 13, 1990

[51] Int. Cl.$^5$ .............................................. G02B 6/38
[52] U.S. Cl. ........................................ 385/60; 385/73; 385/140
[58] Field of Search ................. 350/96.20, 96.21, 96.23

[56] References Cited

U.S. PATENT DOCUMENTS

| | | | |
|---|---|---|---|
| 4,717,234 | 1/1988 | Barlow et al. | 350/96.21 |
| 4,812,006 | 3/1989 | Osborn et al. | 350/96.21 |
| 4,880,291 | 11/1989 | Aberson, Jr. et al. | 350/96.21 |
| 4,898,446 | 2/1990 | Hinckley | 350/96.20 |
| 4,900,124 | 2/1990 | Lampert et al. | 350/96.21 |
| 4,934,785 | 6/1990 | Mathis et al. | 350/96.21 |

Primary Examiner—John D. Lee
Assistant Examiner—Phan T. Heartney
Attorney, Agent, or Firm—Edward W. Somers

[57] ABSTRACT

A cylindrical ferrule type optical fiber connector (20) includes an attenuator arrangement which includes an element (70) that is capable of movement during the assembly of the connector. The connector includes a cylindrically shaped sleeve (60) which has a longitudinally extending slot (61) formed through the wall thereof and which is adapted to receive a cylindrical plug (40) in each end thereof, each plug being spring-biased outwardly from a cap (45) and terminating an optical fiber (21). The attenuator element has a disc-shaped portion (74) which is disposed within the sleeve. A neck portion (76) which extends through the slot of the sleeve connects the disc-like portion to a supporting head portion (72) which engages an outer surface of the sleeve. As a first one plug is inserted into the sleeve, it engages the attenuator element and causes it to be moved along the slot in the sleeve. The insertion of a second plug causes it to engage an opposite side of the element and to move it and the spring-loaded first plug in an opposite direction to a rest position.

17 Claims, 9 Drawing Sheets

OPTICAL FIBER CONNECTING DEVICE INCLUDING ATTENUATOR

TECHNICAL FIELD

This invention relates to an optical fiber connecting device including an attenuator. More particularly, the invention relates to a ferrule connector arrangement having a floating, plate-like attenuator element disposed between and in engagement with end portions of cylindrically shaped plugs of the connector arrangement which terminate optical fibers to be connected.

BACKGROUND OF THE INVENTION

Over the years, optical fiber transmission systems have increased in capacity from several megabits per second (Mb/s) to 2.5 gigabits per second (Gb/s) or higher. Operating at a desired level of bit-error rate (BER) depends in part on connections along an optical path and the strength of received signals. Another consideration is BER degradation attributed to reflections in the optical path. A series of reflection points can generate multiple reflections among themselves thereby worsening the degradation. This is particularly important in high speed lightwave transmission systems (over 1.0 Gb/s) and amplitude modulated (AM) cable television (CATV).

A very much used ferrule connector for terminating and connecting two optical fibers is one which is referred to as an ST ® connector, ST being a registered trademark of AT&T. The ST ® connector is disclosed, for example, in U.S. Pat. No. 4,934,785 which issued on June 19, 1990 in the names of T. D. Mathis and Calvin M. Miller.

An ST connector includes a cylindrical plug or ferrule, as it is often called, having a passageway therethrough for receiving an end portion of an optical fiber to be terminated. The plug which is received in a cap is spring-loaded. When two of the plugs are received end-to-end in a coupling sleeve, one or both of the plugs bodies is moved along its longitudinal axis to make the connection.

Connections between optical fiber ends require great care. Because the core diameter of optical fiber may be as small as 8 microns, it is difficult to align precisely cores of two optical fibers to be connected to achieve tolerable losses. Not only do the cores of the end portions of two optical fibers to be connected need to be aligned, but also the axes of the optical fiber end portions must be parallel.

Additional concerns must be addressed by optical connection arrangements. Often, attenuators are needed in the transmission path to reduce the strength of an incoming signal to a required level. Many optical fiber communication systems require a method of decreasing optical power at a reducing station to avoid the saturation of receivers. Such a reduction in power may be accomplished by introducing into the system a device known as an attenuator which is designed to dissipate or to attenuate a controlled fraction of the input power while allowing the balance to continue through the system.

Changing of the attenuation level also may be required. It is known that the efficiency of a circuit decreases with age and that the power of a signal source which may be adequate at the beginning of life of a circuit later may become inadequate. If the power of the signal at the beginning is chosen so that it remains adequate later, components of the circuit may become saturated early in life. Additionally, the unearthing of cable which results in repairs that add optical loss to the transmission path can be compensated for with a lower loss attenuator. Often times, the required attenuation is induced at a patch panel or at an optical backplane where it is most convenient to insert an attenuator between connectors.

Attenuators for biconic optical connectors are available commercially in various configurations. A biconic connection arrangement generally includes two tapered plugs each terminating an optical fiber with the plugs being received in a sleeve having opposing conically shaped cavities. Typically, prior art in-line biconic attenuators are non-contacting, that is, they are not contacted by the fiber ends in the biconic connector plugs. However, in a recently issued patent, U.S. Pat. No. 4,900,124 which issued on Feb. 13, 1990 in the names of N. R. Lampert, et al., end pedestals of two biconic connector plugs do engage an attenuator element.

Prior art fixed attenuators generally fall into four classes. First, there is an air gap attenuator with various fixed filter elements suspended in the air gap and in which a coupling sleeve includes means for preventing contact between two fiber ends or with the various filter elements suspended in the air gap. A second class design is one which comprises an air gap in which attenuation is increased by increasing the gap. In a third type, a high density, translucent, laminated element that varies in the thickness of a carbon layer thereof for different attenuation levels is mounted in a transverse slot. In one such design, an alignment sleeve includes an attenuating element capable of transverse movement in the alignment sleeve. See, for example, U.S. Pat. No. 4,717,234 which issued on Jan. 5, 1988 in the names of R. W. Barlow, et al. Such a design is intended primarily for multimode-to-multimode connections. A fourth class of attenuator for use in a biconic arrangement includes an index matched spacer. None of these appear to be suitable for use with cylindrical ferrule, single mode to single mode connecting arrangements where low reflectance is important.

Complicating matters for attenuating cylindrical ferrule connections is the recognition that there is no universally accepted ferrule connector. AT&T's ST connector is used widely, as is a Japanese based connector referred to as the FC connector. Desirably, the sought after attenuator may be used for either connector. What is needed and what does not seem to be available is an attenuator which may be used in single mode to single mode ferrule type connecting arrangements, such as for example, ST connector to ST connector, ST connector to FC connector or FC connector to FC connector.

Another problem in arriving at an attenuator having the sought-after features is that during the connection process for the ST connector, movement occurs in a plug which is first inserted into a coupling sleeve when another plug is inserted into the sleeve. Any widely accepted attenuator system must be able to accommodate such movement.

It appears that a widely acceptable in-line attenuator for an ST connector or for the FC connector is not yet available. Attempts have been made to use an air gap attenuator or a membrane material such as carbon Mylar ® plastic in a transverse slot. Materials used for the attenuator have had a somewhat rough contacting surface on a micrographic scale. Those attenuators which have been tried for the ST and FC connectors have not both been capable of low reflection connections.

The use of an attenuator in an optical path also raises a concern about high reflections and reflected power for systems operating above 1.0 Gb/s. High bit rate systems have been plagued by high reflective loss from attenuators that vary either in the length of the air gap or in carbon density.

A significant need arises for a low reflection attenuator that can be used in single mode-to-single mode connections of ST and/or FC connectors in optical systems that operate above 1.0 Gb/s. Light which is reflected from components such as connectors and splices along a fiber link can strike a source of light such as a laser, for example, which may affect adversely the performance of the laser. Optical power fluctuation, pulse distortion and phase noise may result. Also affected adversely may be the wavelength, linewidth and threshold current of laser light sources.

Typically, fixed air gap, non-plug contacting or high density filter elements have been used in optical transmission systems and data links that use multimode-to-multimode or single mode-to-multimode connections. The latter case uses the multimode fiber at the detector in a single mode system as a photon bucket. Although systems of less than 1.0 Gb/s are not typically affected adversely by high reflected power, in some cases, systems of less than 1.0 Gb/s, such as, for example, in two-way transmission on a fiber, can be adversely affected.

Multiple reflections from two or more connections may cause system degradation which is referred to as multiple path interference (MPI). MPI is a phenomenon well known in classical optics and is realized whenever there are two or more optical discontinuities. The two major mechanisms that cause optical discontinuties are connections which are less than ideal and air gap attenuators.

Reflections reduce the signal-to-noise ratio of a receiver by two effects. First, multiple patterns from interferometric cavities that feed back into the transmitter can cause a conversion of a laser's phase noise into intensity noise. The receiver picks up the degraded signal. Also, multiple paths can introduce spurious "ghost signals", which arrive at the detector within variable delays, thereby producing intersymbol interference. Both effects result in an effective power penalty of several dB at the receiver. Inasmuch as these effects are signal dependent, increasing the transmitted power does not improve the error performance. Bit-error rate floors have been observed in laboratory gigabit/second fiber transmission systems due to multiple reflections from connectors and splices.

Reflections occur at a glass-air interface because of the difference in the refractive indices of the two materials. Each optical fiber with its end face cleaved perpendicularly to the fiber axis reflects at about a 3.5% level. When optical fiber ends are polished, the refractive index increases for a thin surface layer whereupon the reflectance can increase to over 5.5%.

Two surfaces such as the end surfaces of two spliced optical fibers form a cavity within which multiple reflections can occur. When the distance between the end faces equals an integral number of half wavelengths of the transmitter wavelength, all round trip distances equal an integral number of in-phase wavelengths and constructive interference occurs. This cause a quadrupling of reflectance to about 14% for unpolished end faces and to over 22% for polished end faces. On the other hand, a quarter wavelength displacement of the surfaces leads to constructive interference and no reflection.

One way of reducing reflective effects at a transmitter is to use an optical isolator which prevents light from reentering the laser. However, the use of an isolator results in some additional forward transmission loss and possible polarization effects.

Reflectances of components also can be reduced by using an index matching oil or gel between interfaces. Perfect matching is not likely because of the difficulty in matching the complex refractive index profile of the optical fiber, contamination from airborne dust, and because of temperature effects on the index material. Connectors which provide for contacting end faces can be used, if care is taken not to damage the end faces during installation or service. Also, anti-reflective coatings can be applied to ends of fibers, but both plugs must be coated, requiring replacement of existing plugs in pairs.

What is needed and what has not been provided by the prior art is an in-line, low-reflection attenuator for ferrule connectors such as the ST or FC connector which overcomes the foregoing problems and which may be used, for example, in single mode-to-single mode connector arrangements. The sought-after attenuator is required for high speed lightwave transmission systems with distributed feedback lasers, and amplitude modulated cable television transmission where unwanted reflections in the network can result in optical feedback into the laser causing laser instability and receiver noise. Also, the sought-after low reflection attenuator is needed to minimize systems degradations due to multiple path interference. The sought after in-line attenuator must be structured keeping in mind that the level of reflected power can be affected adversely by a mismatch in index of refraction in the transmission path, by the length of the gap between optical fiber ends, by laser linewidth, by frequency and by the distance between the two connections.

What is sought and what does not appear to be available in the prior art is a ferrule connector arrangement comprising an in-line attenuator which results in low reflected power. Desirably, the sought after attenuator may be integrated easily and be compatible with existing ST and FC connection systems.

SUMMARY OF THE INVENTION

The foregoing problems of the prior art have been overcome by the ferrule connector arrangement of this invention. A ferrule connector for connecting two optical fibers each having a core and a cladding includes provisions for attenuation which results in relatively low reflected power. Included are two plugs each of which may be cylindrically shaped with a passageway extending therethrough for receiving an end portion of an optical fiber to be connected by the plugs. Each end of a split sleeve is adapted to receive one of the plugs in a manner so that when the two plugs are seated fully in the sleeve with surfaces of the plugs engaging conformable surfaces of walls which define a sleeve cavity, ends of the plugs are adjacent to each other.

An attenuating portion of the connector includes a plate-like element which is mounted in the sleeve between the ends of the plugs. The attenuating portion is suspended slideably in the sleeve with major parallel faces thereof being perpendicular to a longitudinal axis of the sleeve. The plate-like element has an index of refraction which is about equal to that of the cores of optical fibers to be connected. Further, the plate-like element is held in the sleeve and the conformable surfaces of the plugs and the sleeve are such that end faces of the plugs when seated in the sleeve are caused to be in engagement with the plate-like element.

The plate-like element is supported in the sleeve in a manner so that the plate-like element is capable of movement in a direction parallel to the longitudinal axis of the sleeve. This allows the plate-like element to become repositioned in the sleeve as the plugs are seated in the sleeve.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
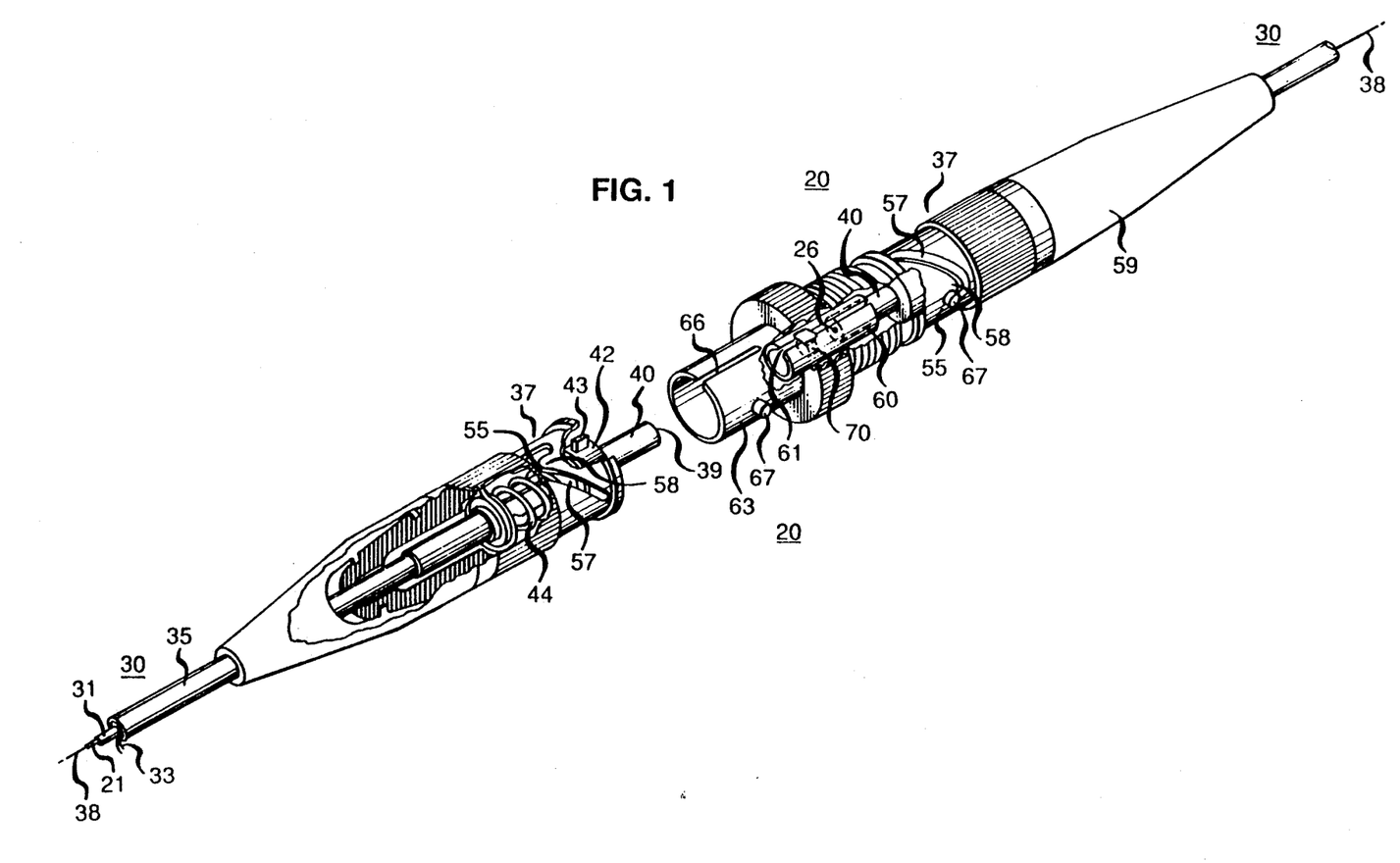
FIG. 1 is a perspective view of a ferrule connector system of this invention which includes an attenuator.
Figure 2:
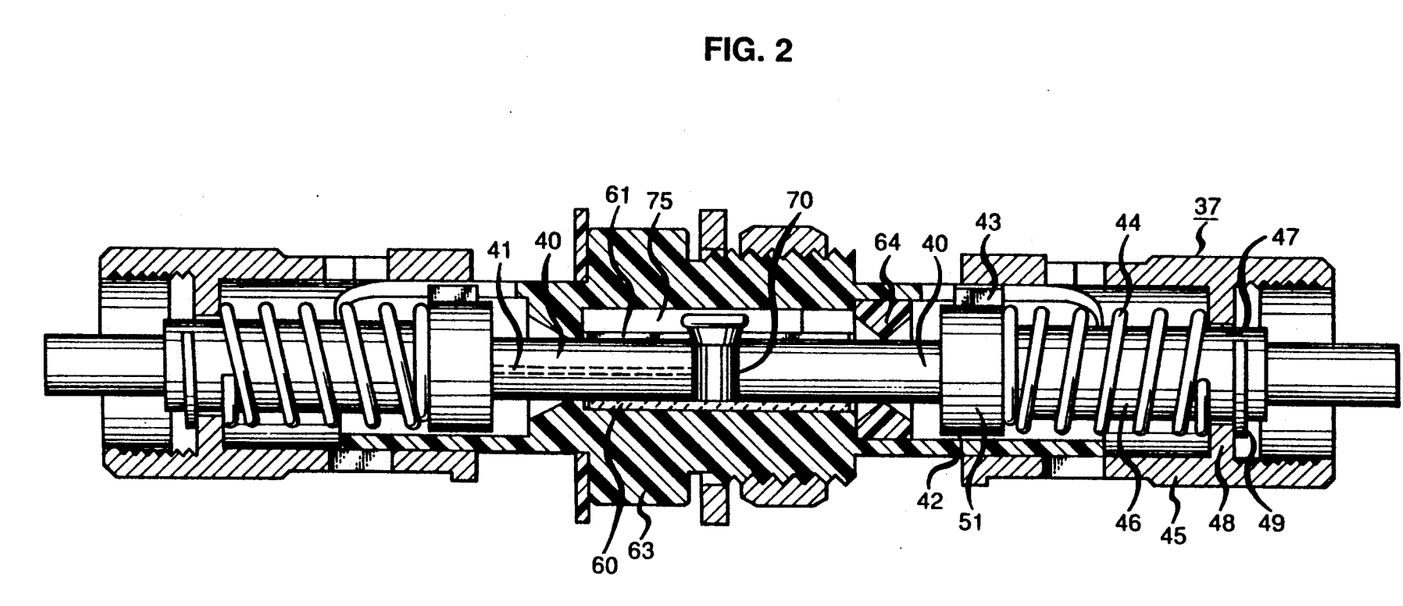
FIG. 2 is an elevational view partially in section of a connector system of this invention.
Figure 3:
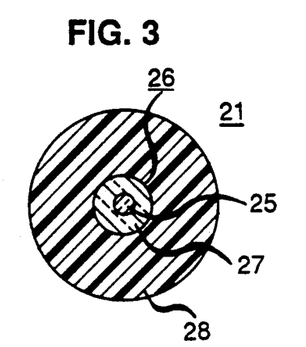
FIG. 3 is an enlarged end view of an optical fiber.

Referring now to FIGS. 1 and 2 there is shown a portion of an optical fiber connector arrangement 20 for providing an optical fiber connection between two optical fibers. The connector 20 is exemplary and others may include the arrangement of this invention. Each of two optical fibers 21—21 (see FIG. 3) to be connected includes a core 25 and a cladding 27, together designated 26, enclosed in a coating 28. The optical fiber may be enclosed in a tube of polyvinyl chloride (PVC) to provide what is referred to as a buffered fiber which may be terminated and connected in accordance with this invention. The connective arrangement of this invention also may be used to connect single fiber cables 30—30 (see again FIG. 1) in which covering a tube 31 of PVC is a strength member 33 such as one made of aramid fibrous material, for example, and an outer jacket 35 which may be comprised of PVC.

Referring to FIGS. 1 and 2, it can be seen that the connector 20 comprises two optical fiber terminations or plug assemblies, each designated generally by the numeral 37. Corresponding elements of the terminations 37—37 are identified with the same numerals. The connector 20 is such that longitudinal axes 38—38 of the terminations are coaxial. In addition to an end portion of an optical fiber 21, each termination 37 comprises an optical fiber terminus or plug 40, having a passageway 41 (see FIG. 2) and being made of a glass, plastic or ceramic material. The plug 40 has an outer diameter of about 2.5 mm. An end face 39 of the plug 40 includes an opening of the passageway 41.

In terminating a cable 30, the coating 28, as well as the tube 31, strength member 33 and outer jacket 35, is removed from an end portion of an optical fiber 21 prior to its termination with a plug 40. Then the uncoated end portion of the optical fiber is inserted into the passageway 41 of each plug 40. The uncoated end portion of the optical fiber 21 is secured within the passageway 41 of the plug 40 and the end faces of the optical fiber are cleaved and polished.

Each termination also includes a connector body 42 or barrel (see FIGS. 1 and 2) made of a plastic or metallic material, a compression spring 44 and a tubular cap 45 made of a plastic or a metallic material. It should be observed that the plug 40, the connector body 42 and the cap 45 each has a cylindrical cross-section. The connector body 42 includes a separate orienting or alignment key 43 which projects radially from the longitudinal axis 38 and which can be installed at any one of a number of positions.

The connector body 42 includes a small diameter portion 46 (see FIG. 2) which extends through an opening 47 in an internally disposed collar 48 in the cap 45. A retaining washer 49 circumscribes the small diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body within the cap 45.

Each plug assembly also may be provided with means for limiting the allowable rotation of the cap 45 with respect to the connector body 42. In order to accomplish this, the cap may include a stud (not shown) which projects inwardly from said annular collar 48 into a camming race provided in the connector body.

Viewing again FIG. 1, it can be seen that the cap 45 includes a longitudinally extending slot 55 which at one end communicates with a circumferentially extending slot 57. The slot 57 is formed so that the tubular wall of the housing which defines it includes a latching projection 58. These slots 55 and 57 are used for securing a termination 37 to another portion of the connector 20.

Completing the connector termination 37, there is shown a portion 59 (see FIG. 1) which may extend from the cap 45 along the optical fiber cable in a conically shaped configuration. This portion of the connector 20 provides strain relief for the termination and ensures that the cable can withstand repeated bends in use after interconnection with another cable without undue stresses being imparted to the optical fibers.

The connector arrangement also includes an attenuator arrangement which cooperates with a sleeve 60 (see FIGS. 1 and 2) having a longitudinal slot 61. In a preferred embodiment, the sleeve is made of zirconia.

The sleeve 60 is disposed within a housing 63 and maintained therein by a retainer 64 (see FIG. 2). The housing includes oppositely extending keyways 66—66 with each keyway 66 being associated with and adapted to receive a key 43. Further, associated with each keyway 66 at each end portion of the housing 63 are two diametrically opposed radially extending latching pins 67—67 each of which is displaced 90° from the associated keyway.

When a plug of one connector is to be inserted into the sleeve 60, the alignment key 43 thereof is aligned with a keyway 66 in the sleeve 60. The plug 40 is inserted into the sleeve as the alignment key 43 is moved along the keyway 66. At the same time, each latching pin 67 enters and moves along a slot 57. At the end of the travel of the plug 40, each latching pin becomes disposed behind a latching projection 58.

Ideally, to achieve minimum loss, the plugs 40—40 disposed within the sleeve 60 should have their longitudinal axes aligned and end faces of the fibers with the end faces 39—39 of the plugs contacting an attenuator element 70 (see FIGS. 1 and 2). The outer surface of each plug 40 and the surfaces of the walls of the sleeve cavities are associated conformable alignment surfaces which are intended to cause desired positioning of the plugs when the end portions of the plugs are received in the sleeve 60. When disposed in the alignment sleeve 60, the plugs should have a desired end separation.

Figure 4:
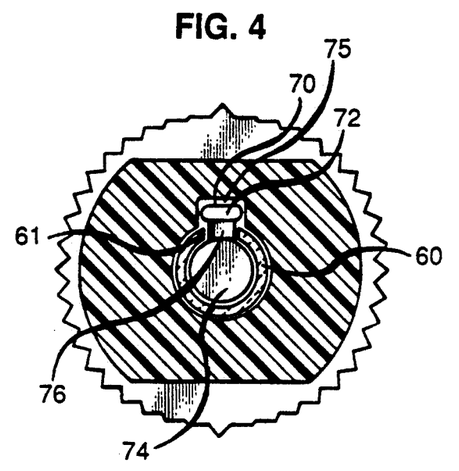
FIG. 4 is an end view partially in section of the connective arrangement of FIG. 2.
Figure 5:
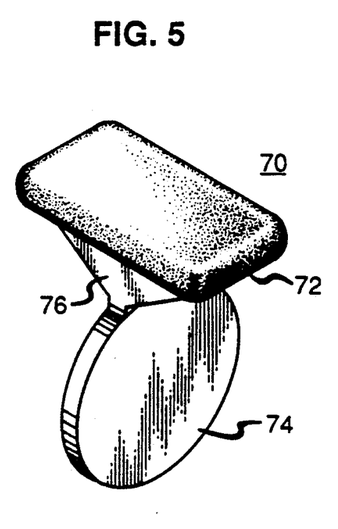
FIG. 5 is an enlarged perspective view of an attenuator element which is disposed with two plugs to be received in a sleeve of the connector arrangement.
Figure 6:
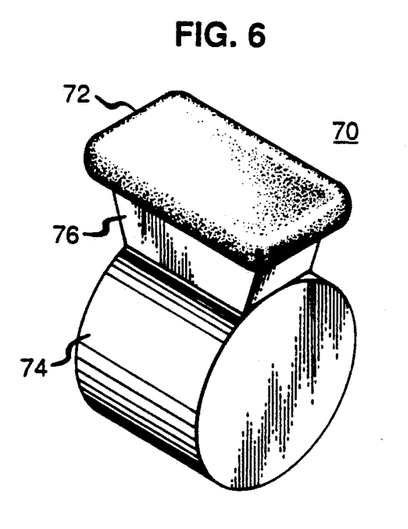
FIG. 6 is an end view in section of an alternative embodiment of an attenuator element of the connective arrangement of this invention.

As mentioned hereinbefore, the connector 20 includes an attenuator arrangement for adding attenuation and reducing return loss. The sleeve 60 includes the longitudinally extending slot 61 which performs a dual function. Not only does the slot 61 allow the sleeve to be compliant with different plug diameters within a tolerance range, but also it allows the attenuator element 70 to be moved longitudinally along the sleeve to be repositioned during insertion of the plugs 40—40. As can be seen in FIGS. 4, 5 and 6, the attenuator element 70 in side elevational view is T-shaped and includes a head 72 and a disc 74 which is engaged by each of the plugs 40—40 when the plugs are seated in the sleeve. The head 72 extends longitudinally along the slot 61 of the sleeve 60 and includes a neck 76 which is capable of being received in the sleeve slot. The head 72 and the neck 76 cooperate to form a rail-like configuration. On the other hand, the disc is plate-like and has a circular configuration in a plane normal to the longitudinal axis 38 of the connector. The head 72 is disposed within a channel 75 (see FIG. 2) which is formed in the housing 63.

As a result of the cooperation between the attenuator element 70 and the sleeve 60, the attenuator element 70 is able to be moved longitudinally within the sleeve. The ST connector is considered a floating design in which the two plugs are spring loaded and are aligned with a compliant split sleeve located in a coupling housing (FIG. 2). When a first plug 40 is inserted into the coupling, the plug overtravels the transverse centerline of the coupling and its movement is arrested by the engagement of the plug connection body with a coupling shoulder. When the second plug is joined to the other side of the coupling and contact with the attenuator element is made by the two plugs, the first plug is pushed backwards until equilibrium is reached between the spring loading of the two plugs provided by the compression springs 44—44.

Consequently, in designing an attenuator element which is placed between the fiber end-faces of the two plugs, one must either prevent the first plug from overtraveling the centerline of the coupling or provide an arrangement for the attenuator element to travel with the plug. The latter approach is used for the attenuator element 70 by using an attenuator disc which is supported by a rail.

The disc 74 is selected of a suitable thickness, flatness, surface finish, and parallelism to maintain fiber-end contract and to provide the desired attenuation. Viewing again FIGS. 5 and 6, the operative stem portion 74 of the attenuator has a thickness which ranges from about 200 to 1750 microns for a 5 dB to a 20 dB loss, respectively. Using polymethylmethacrylate (PMMA) plastic, the attenuator elements 70—70 are molded in various thicknesses to attain an attenuation range between 5 and 20 dB.

The rail, comprising the head and neck, allows the element to be moved by sliding along the slot in the ferrule sleeve, which is parallel to the fiber axis. The assembly, which is shown in FIG. 4, has the neck riding in the slot of the split coupling sleeve. The rail and slot arrangement act to position and support the attenuator disc. Further, it provides freedom of longitudinal movement of the disc which is needed in the connection and disconnection of the plugs.

What is important is the adjustable nature of the attenuator element 70 in the slot 61. The hereinbefore described attenuator arrangement requires only that the ST connector coupling housing provide clearance for the attenuator support rail 72 to ride in the zirconia split sleeve 60. Also, the width of the slot 61 in the sleeve 60, i.e. about 1.0 mm, has been increased over that of a prior art sleeve, i.e. about 0.5 mm, so as to allow the neck of the attenuator element 70 to extend therethrough. As one connector plug is inserted into one end of the sleeve 60 and seated therein, the attenuator element 70 is engaged by an end of the inserted plug to cause the attenuator to be moved slightly in the same direction as the direction of insertion, that is in a direction parallel to the longitudinal axis 38 of the connector. Then, when the other plug is inserted into the opposite end of the sleeve 60, the end of the other plug engages the attenuator element and causes it to be held securely between the two plugs. The floating support of the attenuator element is accomplished by the moveable element between fiber ends of two plugs with a material element having a thickness which is equal to a required value. Also, the attenuator element has an index of refraction which is similar to that of the transmitting fiber core, i.e. glass.

The plug travel allows for greater compression of the spring, resulting in additional space for a range of attenuator disc thicknesses. This allows the installation of attenuator elements having thicknesses on the order of 1.75 mm or less for a loss of 20 dB or less, while maintaining plug contact and float.

Well known splice-loss theory predicts single mode insertion loss (IL) for longitudinally displaced fibers. Additionally, Snell's law of refraction describes how light waves behave between materials with different indices of refraction, causing bending of light rays. Light accepted by a second fiber must impinge the core area and be within the critical angle of the fiber to be received.

For this invention, the attenuator element thickness and insertion loss (IL) were determined by the following equation:

$$IL = -10\alpha \log\left(\frac{(1)}{(1 + (Z_0/k_g w^2))^2}\right) + IL\text{gap(dB)},\quad (1)$$

where $Z_0$ is the gap between fibers, $k_g = 2\pi n_0/2\lambda$, w = mode field radius (MFR) with $MFR_{1310nm} = 4.35$ μm and $MFR_{1550nm} = 4.85$ μm, and wherein correction factor $a_{1310nm} = 0.92$ and $a_{1550nm} = 0.88$, and verified experimentally for both IL and return loss (RL) on PMMA elements.

Figure 7:
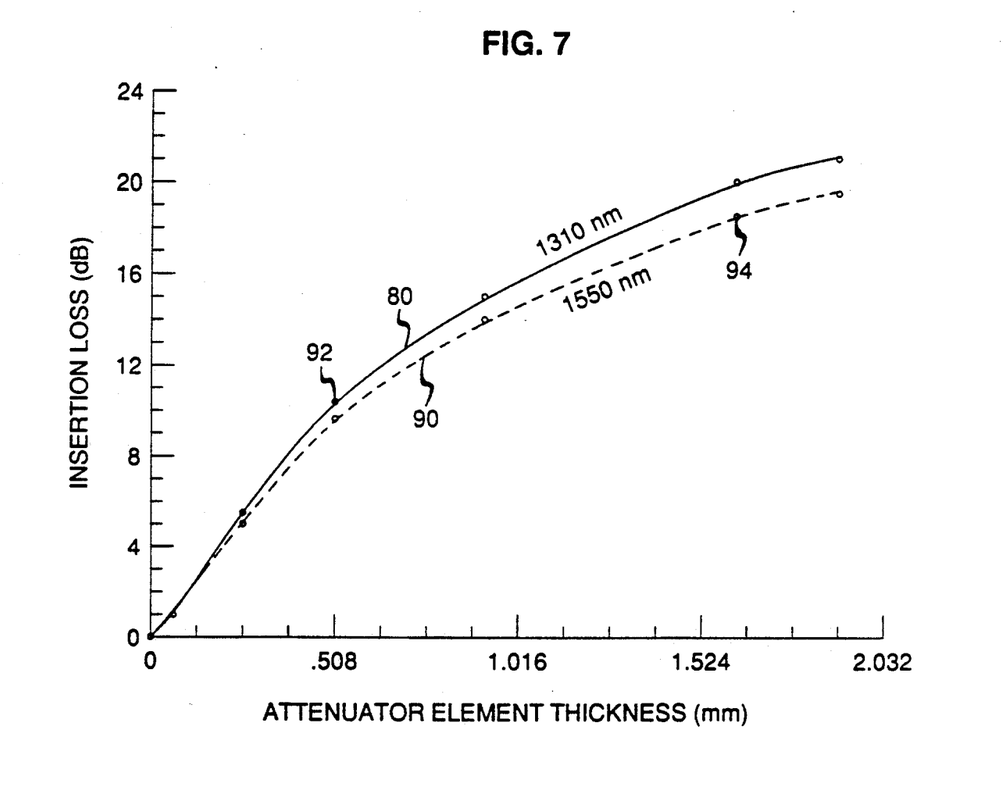
FIG. 7 is a graph which depicts the relationship between the attenuator thickness and insertion loss.

FIG. 7 shows plots designated 80 and 90 which depict the relationship between the theoretical insertion loss and attenuator element thickness at wavelengths of 1310 nm and 1550 nm. The plots are in accordance with equation (1). Each data point represents an average loss value for a group of attenuator elements 70—70 for the thickness corresponding to that data point. As thickness increases, insertion loss increases. What is desired is an attenuator element 70 that provides acceptable performance at both wavelengths.

It should be noted that insertion loss, which is a function of wavelength and mode field radius, is nearly independent of wavelength. A correction factor "a" is inserted into the equation to shift the theoretical curves downward slightly to compensate for inaccuracies in the exact indices of refraction, wavelength, fiber core variations, or large $Z_0$ values, for example. FIG. 7 includes average data designated by points 92—92 at 1310 nm and 94—94 at 1550 nm from ST connectors of this invention. It should be noted that this arrangement for attenuation works equally well at 780 nm single mode to single mode transmission with a further wavelength dependent shift.

The connection arrangement of this invention, which includes the attenuator element 70, results in substantially lower reflected power than in prior art arrangements. As is known, the index difference, n, along an optical path causes reflection as stated by the following equation for return loss:

$$RL = 10 \log \left( \frac{(n_0 - n_1)}{(n_0 + n_1)} \right)^2, \quad (2)$$

where $n_0$ and $n_1$ are indices of refraction for two interfacing materials.

In one example in which ends of two optical fibers are connected through a connector, glass-to-air interfaces were established with an $n_0$ of 1.0 for air and an $n_1$ of 1.468 for the core glass of each optical fiber. Applying the foregoing equation, eq. (2), for return loss, the reflected power was found to be approximately 3.6% or $-14.4$ dB.

For this arrangement, both glass-to-air and air-to-glass interfaces contribute to the reflected power, which can be excessively high. On the other hand, for a substantially larger air gap, the reflected loss is dominated by that interface between core glass and air which is first encountered in the direction of light transmission. The second interface, that is from air-to-glass in the direction of transmission, has much less effect because of the attenuation caused by the transmission through the lengthened air gap.

Another arrangement may include spaced fiber ends with an acrylic or Mylar plastic, in-line, plate-like attenuator element suspended in the air gap. In this attenuator there are multiple reflected surfaces, even though, at best, the attenuator can contact only one fiber end with an air gap between the attenuator and the other fiber end. Even with an attenuator material having an index $n_0$ which is close to that of glass, high reflections can occur when relatively small air gaps exist. For low attenuation values, this gap is more critical. Reflected power in this arrangement, where the fiber contacts only one side of the optical disc, also is a function of the direction of optical transmission through the attenuator-air gap. The reflected power generally will be less if the direction of the transmission is through a contacting optical fiber-attenuator interface, through the attenuator and through the air gap to the second fiber end. If the direction of transmission is in the opposite direction, the reflected power can be similar to that across a relatively small air gap without an attenuator. In cases where a small gap exists on both sides of a plate-like low-value attenuator, i.e. 5 dB, poor return loss on the order of $-6$ dB has been measured.

The attenuator arrangement of the connector 20 of this invention results in significantly less reflected power than in prior art cylindrical ferrule connection arrangements. This is accomplished by causing both plugs to engage the in-line attenuator element 70, thereby avoiding an air gap. It should be noted that the second plastic-to-optical fiber core glass interface, providing there is contact with the plug ends, is of less consequence because the low level of reflected power from the second interface would be attenuated by the two way loss of the attenuator. For example, the total return loss from an arrangement in which there is a $-40$ dB loss from a first glass to attenuator interface and a $-40$ dB loss from the second interface between the attenuator and glass, on the outgoing side, and a 10 dB attenuator which contributes 20 dB for a round trip amounts to $-39.96$ dB. This is a negligible difference from that provided at the first interface.

Advantageously, the connector 20 of this invention is compatible with existing connectors in the field. For example, if all new sleeves were to be provided with an attenuator, it becomes important that plugs already in use in the field be useable with such sleeves. As should be apparent, the use of a sleeve 60 with an attenuator in no way impedes its use with existing plugs.

Figure 8:
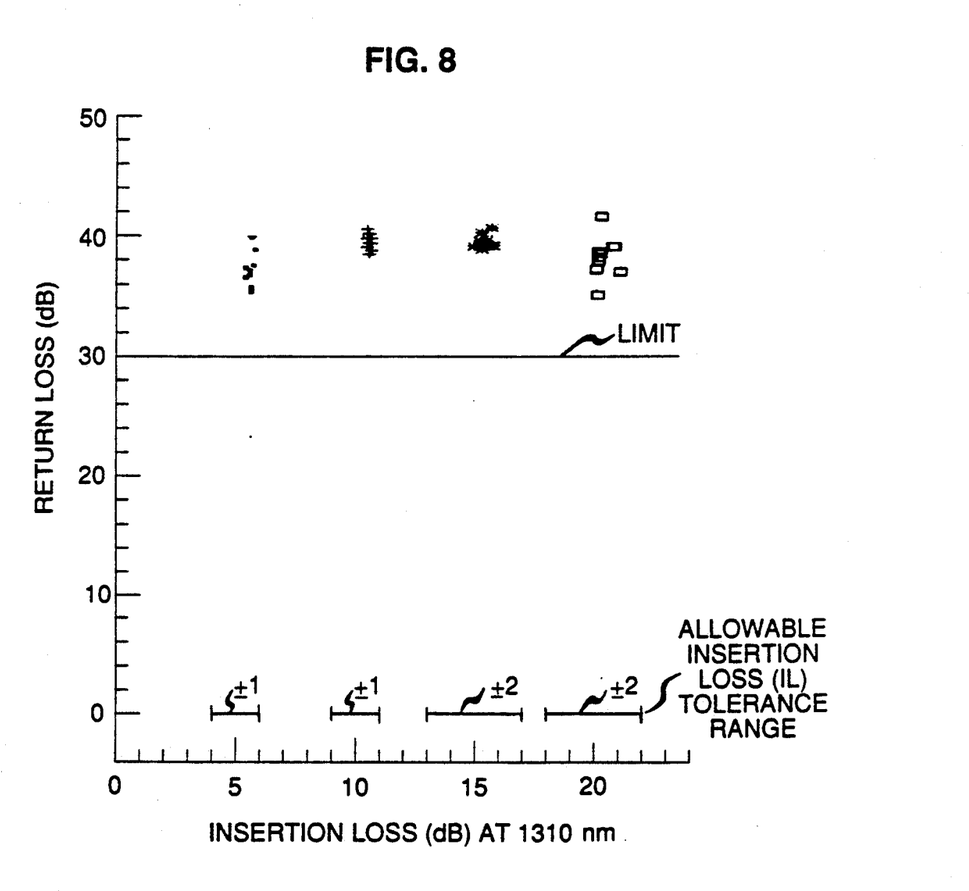
FIGS. 8-10 depict graphs of performance characteristics of an attenuator system of this invention.

FIG. 8 depicts data points of return loss in $-$dB as a function of insertion loss in dB at 1310 nm for attenuator elements 70—70 of this invention. A relatively low return loss attenuator would be depicted by data points above the acceptable limit line in FIG. 8. For attenuator elements grouped at insertion losses of 5 dB, 10 dB, 15 dB, 15 dB or 20 dB, for example, it can be seen that the data points are above the acceptable return loss limit and within the allowable insertion loss tolerance range. This plot shows that the attenuator of this invention is a relatively low reflection design. The object of using an attenuator element of index matched material is to achieve a measured amount of insertion loss with a low reflectance. The thicker the element 70, the greater the loss. Because the attenuator element contacts the fiber ends, reflectance is minimized.

Figure 9:
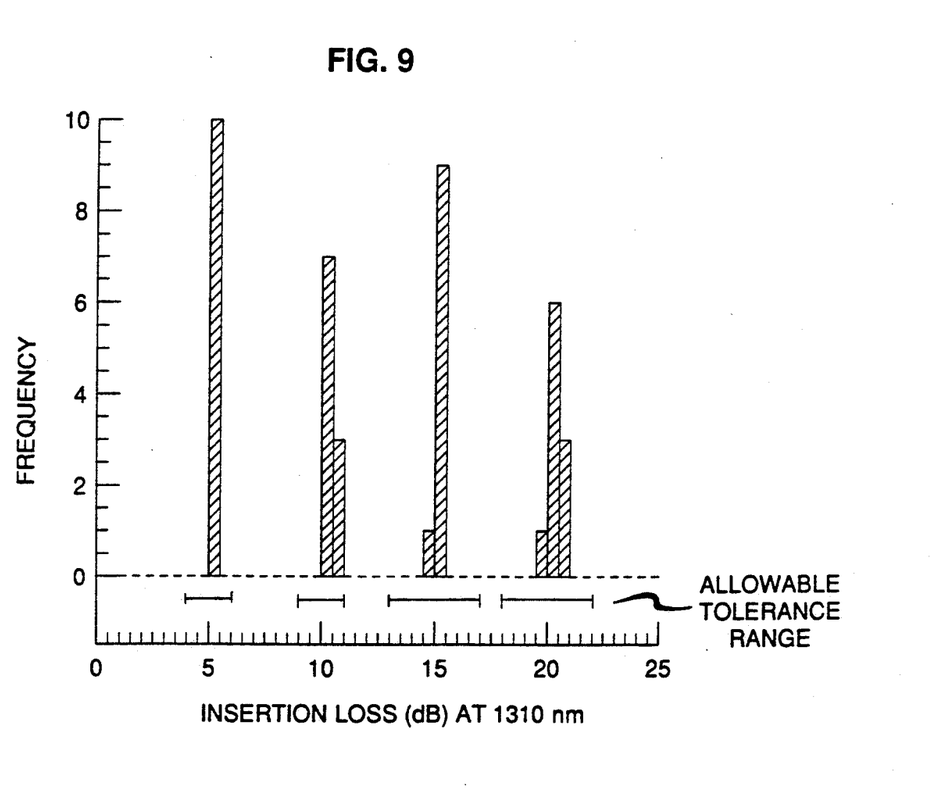

FIG. 9 depicts histogram plots of frequency versus insertion loss in dB at 1310 nm. Allowable tolerance ranges are shown along the X axis. FIG. 9 shows that the results are reproducible. All samples in each insertion loss band have a relatively narrow distribution. Although the distribution is greater for insertion losses of 15 and 20 dB, they are still within the tolerance window.

Figure 10:
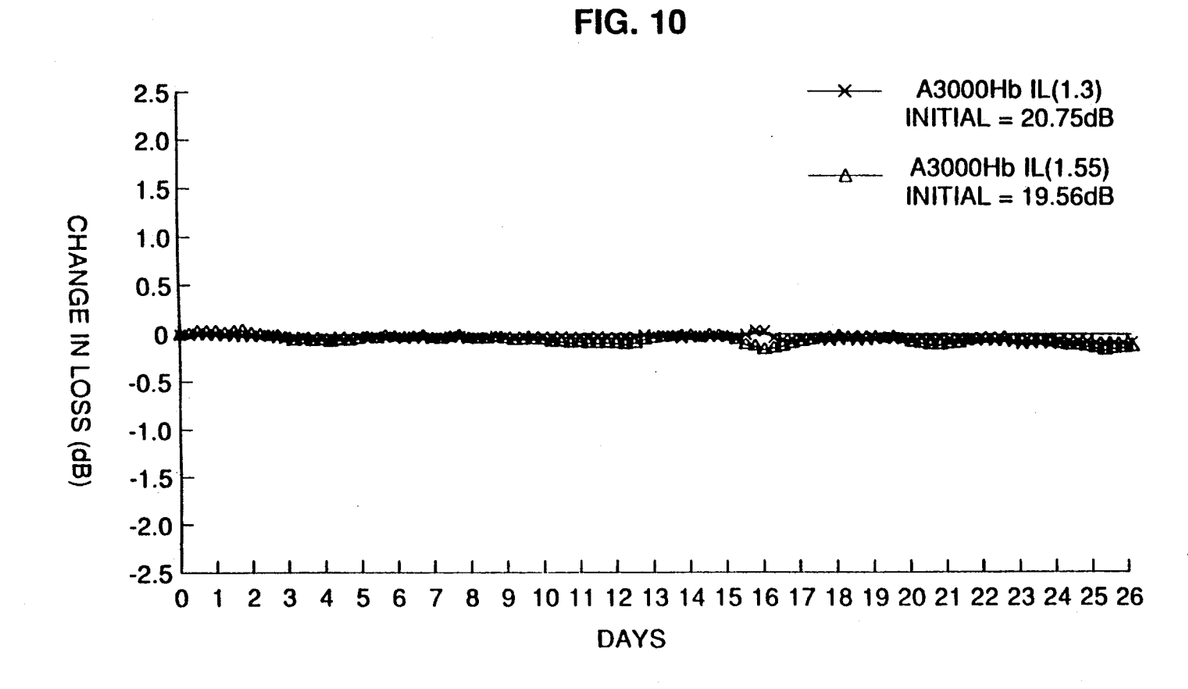

FIG. 10 depicts the results of a humidity test for the attenuator of this invention at 90 to 95% relative humidity at 60° C. As can be seen, the change in loss with time is negligible. This demonstrates that the attenuator is very stable with respect to time and humidity.

It should be noted that attenuators of this invention may be used also for FC to FC connections and for hybrid FC to ST connectors. Viewing now FIG. 11, there is shown an FC to FC connecting arrangement designated by the numeral 100. A coupling 102 having center flange portions 104—104 includes two opposed entrances 106—106. Each entrance 106 includes an externally threaded portion 107 and a circular boss 108 having a flared entry portion 109. An outer diameter of each boss 108 is less than an inner diameter of the coupling 102 to provide an annular space 111 about each end.

Figure 11:
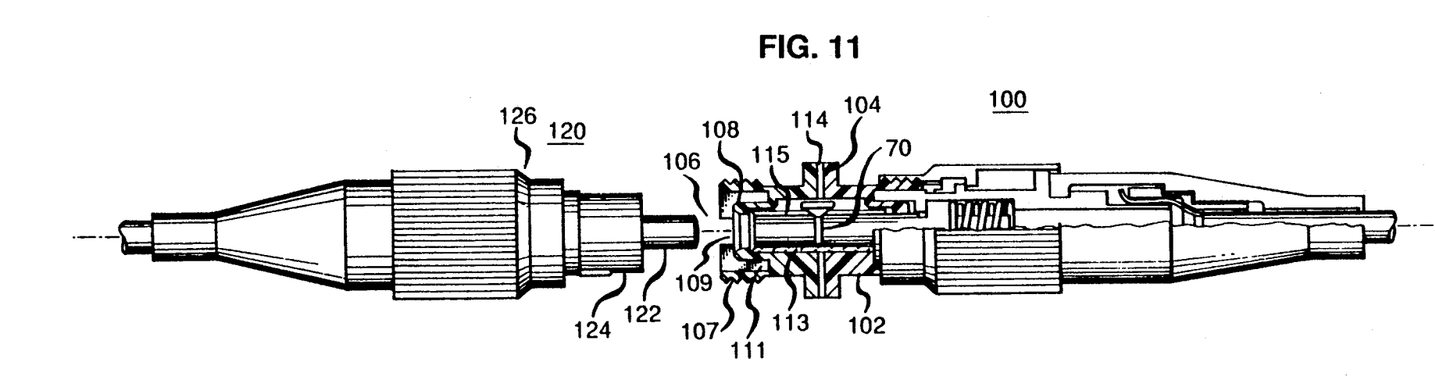
FIG. 11 is a view of another embodiment of an attenuator of an FC connector system which includes an attenuator element disposed in a sleeve with one plug being received in the sleeve and a second plug positioned for insertion.

Disposed within the coupling 102 is a sleeve 113. The sleeve has a slot 115 formed longitudinally therealong, the slot having sufficient width to allow a neck portion of an attenuator element 70 to extend therethrough. The sleeve is retained within the coupling by engaging stepped inner portions of the bosses 108—108.

A fiber to be connected to another by an FC arrangement is terminated by a plug assembly 120. Each plug assembly 120 includes a cylindrical plug or ferrule 122 which terminates a fiber. The plug 122 is received in a connector body or barrel 124 which is received in cap 126 that is threaded internally. The cap 126 is adapted to be turned threadably over the threaded portion 107 of the coupling 102 and to slide over the barrel 124. The barrel and plug are biased outwardly by a spring.

When a connection is desired, a craftsperson causes the plug 122 of the plug assembly to become disposed in the sleeve 113 to contact an attenuator element 70 which is supported in the sleeve. The barrel 124 is moved slideably over the boss 108 while the cap 126 is turned threadably over an end portion 107 of the coupling. In the FC arrangement, an appropriately sized spacer 114 is disposed between flange portions to compensate for the lack of sufficient travel of the FC plugs 122—122.

Figure 12:
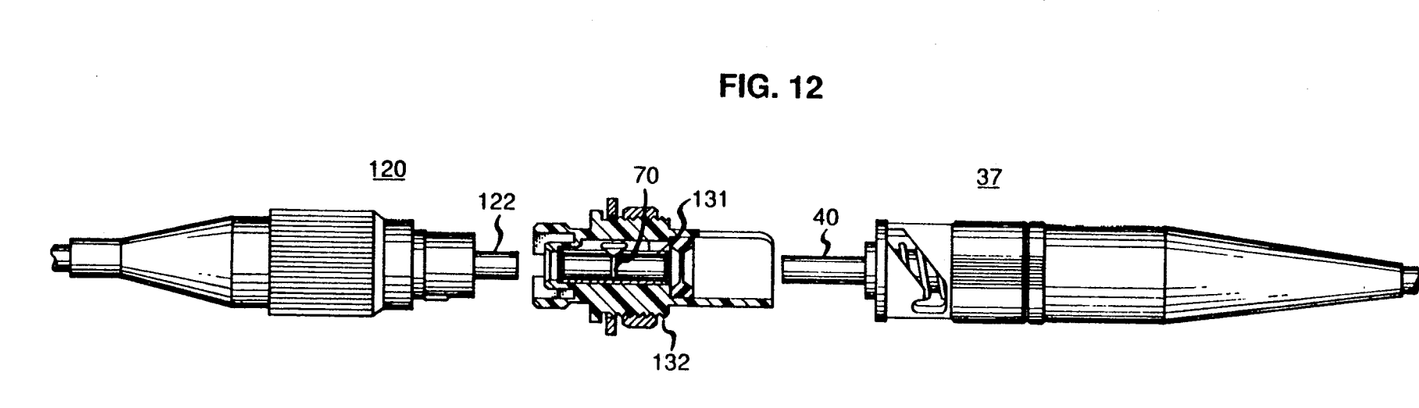
FIG. 12 is a view of another embodiment of an attenuator system of this invention with an ST connector to FC connector arrangement.

Viewing now FIG. 12, there is shown as ST connector to FC connector arrangement. By this is meant that an ST connector ferrule is adapted to be connected optically through an attenuator arrangement with an FC connector ferrule. The capability demonstrates the versatility of the connector arrangement of this invention.

The arrangement of FIG. 12 includes one portion, the right-hand portion as viewed in FIG. 12, which is similar to that of FIG. 2 and the other half similar to the arrangement of FIG. 11 with a match being made along a line disposed at about the halfway point of a sleeve 131 which is disposed in a housing 132. Inasmuch as portions of the ST connector portion and of the FC connector portion have been described hereinbefore, no further description of these portions is deemed necessary.

As shown in FIG. 12, insertion of either the plug of the FC connector portion or the plug of the ST connector portion causes the plug of either to engage the disc of the attenuator element 70 and causes the element, which is suspended by the rail, comprising the head and the neck, to be moved in a direction along the sleeve. Insertion of the other plug engages the other major surface of the disc and causes the disc to be moved in an opposite direction until the other plug assumes its connective position.

It is to be understood that the above-described arrangements are simply illustrative of the invention. Other arrangements may be devised by those skilled in the art which will embody the principles of the invention and fall within the spirit and scope thereof.

We claim:

1. An optical fiber connecting system, which has provisions for attenuation with low reflectance to the system, said connecting system comprising:
   a first plug which terminates one optical fiber;
   a second plug which terminates another optical fiber;
   a sleeve having a longitudinal slot through the wall thereof, the sleeve adapted to receive one of the plugs in each end thereof; and
   an attenuating element comprising a plate-like portion being made of a material having an index of refraction substantially equal to that of glass, and a rail including a depending portion from which said plate-like portion is supported, said depending portion adapted to be received in said slot with said plate-like portion becoming disposed in said sleeve and with a portion of said rail disposed adjacent to an outer surface of said sleeve, said attenuating element being capable of being moved longitudinally along said sleeve as each said plug is inserted into said sleeve and said element being engaged by each said plug when said plugs are seated in said sleeve.

2. The optical fiber connecting system of claim 1, wherein said sleeve is disposed in a housing having opposed end portions, each end portion including an outer portion which is threaded externally and an inner boss which is disposed concentrically within and spaced from said outer portion and wherein said system includes two plug assemblies, each of which includes a plug,
   each said plug being supported in and extending from a connector body portion which is adapted to become disposed about said boss of an end portion of said housing when said plug is received in said sleeve, further said plug assembly including an internally threaded cap which is slideably moveable with respect to said connector body portion such that when said plug is received in said sleeve and said connector body portion is disposed about said boss, said cap is capable of being moved slideably with respect to said connector body and turned threadably onto threads of said outer portion of said housing.

3. The optical fiber connecting system of claim 2, wherein said housing includes a spacer to allow both of said plugs to become disposed in said sleeve notwithstanding a limited amount of retrograde motion of each said plug when said plugs engage said attenuating element.

4. The optical fiber connecting system of claim 1, which includes two plug assemblies and wherein said sleeve is disposed in a housing having opposed end portions, a first one of said end portions including an outer portion which is threaded externally and an inner boss which is disposed concentrically within and spaced from said outer portion and wherein the opposed second end portion includes a tubular portion having a longitudinally extending keyway therein and two diametrically opposed latching pins projecting from an outer surface thereof,
   a first one of said plug assemblies including said first plug extending from a connector body which is adapted to become disposed about said boss of said first end portion of said housing when said first plug is received in said sleeve and further including a cap which is slideably moveable and which is internally threaded to be turned threadably over said outer portion of said first end portion of said housing when said first plug is received in said sleeve; and a second one of said plug assemblies including a connector body from which said second plug extends, said connector body of said second plug assembly having a key projecting therefrom to be received in said keyway of said housing when said second plug is received in said sleeve, said second one of said plug assemblies also including a cap which is disposed concentrically about at least a portion of said connector body and which includes two camming slots and associated latching slots so that as said second plug is inserted into said sleeve and said key is received in said keyway of said housing, each of said pins of said housing is caused to be moved along a camming slot and become disposed in the latching slot associated therewith to hold said cap of said second plug assembly assembled to said housing.

5. The optical fiber connecting system of claim 4, wherein said second plug assembly includes a compression spring disposed about said connector body thereof and said first plug assembly includes resilient means for biasing said first plug outwardly of said first plug assembly.

6. An optical fiber connector for connecting an optical fiber of an optical fiber cable to optical means, said connector comprising:

a plug assembly which includes an entrance end for an optical fiber cable comprising an optical fiber and a connection end, a plug adapted to terminate an optical fiber, a cap which is assembled to said plug, and resilient means for urging said plug outwardly of said cap in a direction away from said optical fiber entrance end, said plug assembly adapted to be connected to optical means at said connection end;

sleeve means for receiving said plug of said plug assembly in one end thereof and optical means disposed adjacent to said plug to cause the optical fiber terminated by said plug to become connected operatively to the optical means, said sleeve having a wall which conforms to the configuration of the plug to be received therein with said wall having a slot formed longitudinally therethrough; and an attenuating element which is adapted to be moveable slideably along a substantial length of said sleeve, said attenuating element including a portion disposed within said sleeve and supported by a rail which includes a portion extending through said slot, said portion of said attenuating element within said sleeve adapted to be engaged by said plug when said plug is inserted into said sleeve.

7. The optical fiber connector of claim 6, wherein plug assembly also includes a connector body for holding said plug, said connector body including a portion to which is secured an end portion of the optical fiber cable, said attenuating element including a disc-like portion which is supported within said sleeve and which is connected by a neck portion to a supporting portion, said supporting portion being disposed outside said slot and engaging an outer surface of said sleeve with said neck portion extending through said slot.

8. An optical fiber connector for connecting one optical fiber to another optical fiber, said connector comprising:

first and second plug assemblies each of which includes a cylindrically shaped plug having a passageway therethrough and being adapted to terminate an optical fiber disposed in said passageway and a cap which encloses a portion of said plug, each of said plug assemblies including means for causing said plug thereof to be biased outwardly in a direction from a fiber entrance end toward an opposite end thereof;

coupling means including a housing and a sleeve for receiving end portions of the plug of each of said plug assemblies to hold said end portions in said sleeve in alignment with each other, each said cap being adapted to be secured to an end portion of said housing of said coupling means, said sleeve having a wall which conforms to the configuration of the plugs to be received therein with said wall having a slot formed longitudinally therethrough; and an attenuating element which is adapted to be moveable slideably along a substantial length of said sleeve, said attenuating element including a portion disposed within said sleeve and supported by a rail which includes a portion extending through said slot, said portion of said attenuating element in said sleeve adapted to be engaged by each said plug when each said plug is inserted into said sleeve.

9. The optical fiber connector of claim 8, wherein each of said plug assemblies includes a cap having an annular inwardly projecting lip through which a connector body in which is disposed an end portion of said plug extends, said connector body having an enlarged end portion in which is disposed said end portion of said plug, each said plug assembly also including a retaining clip which is disposed about said connector body adjacent to an inner side of said lip and a compression spring disposed about said connector body and engaging an outer side of said lip and an inner side of said enlarged portion of said connector body to urge said connector body and plug outwardly with said retaining clip holding said plug in said cap, said connector body also including a key which projects radially from and is attached to said enlarged portion thereof.

10. The optical fiber connector of claim 9, wherein said housing also includes a latching pin, said pin being received in a camming slot provided in said cap such that when said pin is disposed adjacent to an inner end of said slot, inadvertent rotary relative motion between said coupling housing and said cap is prevented.

11. The optical fiber connector of claim 10, wherein each said cap includes two diametrically opposed camming slots each of which extends from a coupling end of said cap inwardly helically about said cap, each of said camming slots communicating with an associated latching slot which extends from an inner end of the associated camming slot outwardly in a direction parallel to a longitudinal axis of said plug, each said cap also being provided with diametrically opposed entrances, each said entrance at a coupling end of said cap communicating with an outer end of an associated camming slot, said coupling housing including a longitudinally extending keyway which extends from an entrance end of said housing and a pair of diametrically opposed latching pins projecting outwardly from said housing, said pins and said keyway being such that when a cap of a plug assembly is aligned with said coupling means such that the key of said plug is aligned with a keyway in an end of said housing, said pins of the coupling housing are aligned with said camming slots of said cap and adapted to be moved along said entrances into said camming slots and into said latching slots to allow said plug assembly to be secured to said coupling means.

12. An optical fiber connection for connecting one optical fiber to another optical fiber, said connection comprising:
   first and second terminated optical fibers each including:
      a plug assembly which includes a cylindrically shaped plug having a passageway therethrough and a cap which encloses a portion of said plug, each of said plug assemblies including means for causing said plug thereof to be biased outwardly in a direction from a fiber entrance end toward an opposite end thereof; and
      an optical fiber cable which includes an optical fiber having an end portion disposed in said passageway of said plug;
   coupling means including a housing and a sleeve for receiving an end portion of the plug of each of said plug assemblies to hold said end portions in said sleeve in alignment with each other, each said cap being secured to an end of said housing of said coupling means and said sleeve having a longitudinal slot formed through a wall thereof; and
   an attenuating element which is adapted to be moveable slideably along a substantial length of said sleeve, said attenuating element having a portion thereof disposed within said sleeve, supported by means having a portion which extends through said slot in said wall of said sleeve and engaged by each said plug.

13. The optical fiber connection of claim 12, wherein each of said caps includes an annular inwardly projecting lip through which a connector body in which is disposed an end portion of a plug extends, said connector body having an enlarged end portion, said plug assembly also including a retaining clip which is disposed about said connector body adjacent to an inner side of said lip and a compression spring disposed about said connector body and engaging an outer side of said lip and an inner side of said enlarged portion of said connector body to urge said connector body and plug outwardly, said retaining clip being effective to hold said plug in said cap.

14. The optical fiber connection of claim 13, wherein said connector body also includes a key which projects radially from and is attached to said enlarged portion thereof.

15. The optical fiber connection of claim 14, wherein each said cap also includes a stud which projects inwardly from said lip, said stud being received in a camming race provided in said connector body such that when said stud is disposed at an inner end of said race, unintended rotary relative motion between said connector body and said cap is prevented.

16. The optical fiber connection of claim 14, wherein each said cap includes two diametrically opposed camming slots each of which extends from a coupling end of said cap inwardly helically about said cap to a location adjacent to said lip, each of said camming slots communicating with a latching slot which extends from an inner end of the associated camming slot outwardly in a direction parallel to a longitudinal axis of said plug, each said cap also being provided with diametrically opposed entrances, each said entrance at a coupling end of said cap communicating with an outer end of an associated camming slot, said coupling housing including a longitudinally extending keyway which extends from an entrance end of said housing and a pair of diametrically opposed latching pins projecting outwardly from said housing, said pins and keyway of said housing being such that when a cap is aligned with said coupling means such that the key of a plug assembly is aligned with said keyway in an end of said housing, said latching pins of said coupling housing are aligned with said entrances of said cap and adapted to be moved into said camming slots and into said latching slots to secure said plug assembly to said coupling housing.

17. An optical fiber connection, which comprises:
   a coupling housing which includes two end portions and which includes a pair of pins projecting radially from each end portion;
   a sleeve which is disposed within said housing, and which has a slot formed longitudinally through a wall thereof;
   first and second terminated optical fiber cables, each comprising;
      an optical fiber cable which includes an optical fiber;
      first and second plug assemblies each of which includes:
         a cylindrically shaped plug having a passageway therethrough for holding an optical fiber end portion of the cable, each said plug being disposed in said sleeve such that the optical fiber end portion in one of said plugs is connected optically to the optical fiber end portion in the other one of said plugs;
         a cylindrically shaped connector body having an enlarged portion at one end thereof with a key extending radially therefrom and a stepped passageway therethrough, an enlarged portion of said passageway being disposed in said enlarged portion of said connector body for receiving an end portion of said plug, said connector body including a circumferential groove and a circumferential camming groove adjacent to an opposite end thereof, said connector body having an extension at an opposite end and having a diameter less than the diameter of said enlarged portion;
         a retaining ring which is disposed about and in engagement with said extension;
         a retaining clip which is disposed about said circumferential groove;
         a compression spring which is disposed about said connector body; and
         a cap including an inwardly threaded cable entrance end and a connection end from which protrudes said plug, said cap including an annular, inwardly projecting lip having an inwardly projecting stud with said spring being in engagement with one side thereof and with said enlarged portion of said connector body and said retaining clip in engagement with the other side thereof, said cap being secured to said coupling housing and said stud of said lip being disposed at an inner end of said camming groove of said connector body to cause said key to be disposed generally centrally between two opposed camming slots opening to said connection end of said cap to facilitate assembly of said plug assembly to said coupling housing, each of said camming slots helically extending and communicating with a latching slot, each of said pins of said coupling housing being disposed in one of said latching slots; and an attenuating element which is adapted to be moveable slideably along a substantial length of said sleeve, said attenuating element including a disc-like portion which is disposed within said sleeve in engagement with an end face of each said plug and which is supported from a rail having a portion which depends through said slot of said sleeve.

* * * * *